United States Patent [19]
Tillma

[11] 3,716,732
[45] Feb. 13, 1973

[54] VERTICAL INDUCTION MOTOR
[75] Inventor: James Earl Tillma, Schenectady, N.Y.
[73] Assignee: General Electric Company
[22] Filed: Sept. 21, 1970
[21] Appl. No.: 73,767

[52] U.S. Cl. ..........................310/61, 310/74, 310/90
[51] Int. Cl. ..............................................H02k 9/00
[58] Field of Search......310/61, 157, 153, 70, 60, 74, 310/58, 54, 52, 64, 59, 90; 74/572; 46/206, 243 M, 243 LV

[56] References Cited

UNITED STATES PATENTS

| | | | |
|---|---|---|---|
| 2,600,844 | 6/1952 | Caputo | 310/157 |
| 2,377,937 | 6/1945 | Hervert | 310/57 |
| 2,571,267 | 10/1951 | Ljunggren | 310/157 UX |
| 2,694,157 | 11/1954 | Cone | 310/64 |
| 3,441,758 | 4/1969 | Albright | 310/58 |

FOREIGN PATENTS OR APPLICATIONS

| | | | |
|---|---|---|---|
| 878,357 | 1/1943 | France | 310/70 |

*Primary Examiner*—J. D. Miller
*Assistant Examiner*—R. Skudy
*Attorney*—John J. Kissane, James C. Davis, Jr., Frank L. Neuhauser, Oscar B. Waddell and Joseph B. Forman

[57] ABSTRACT

A vertical induction motor is described characterized by a rotor, a single flywheel, a double acting thrust bearing and an anti-reverse device sequentially mounted along the motor shaft. A partition serves to separate the double acting thrust bearing from the flywheel and the thrust bearing is enclosed within a housing which encompasses an oil reservoir in association with a sleeve concentrically mounted between the motor shaft and the thrust bearing. In the event of minor leakage, oil between the sleeve and the shaft is removed by centrifugal action at a shoulder situated along the shaft and the oil is collected in a centrifugal seal having an upwardly protruding annular lip proximate the motor shaft. A second partition also is disposed between the rotor and the flywheel to restrict contact between the flywheel and air circulating within the rotor except at selected apertures disposed radially inward of the partition. Circulating air thus flows in a first radially inward direction on one side of the partition free from interference with the rotating flywheel while flowing in an opposite direction on the other side of the partition proximate the flywheel.

6 Claims, 1 Drawing Figure

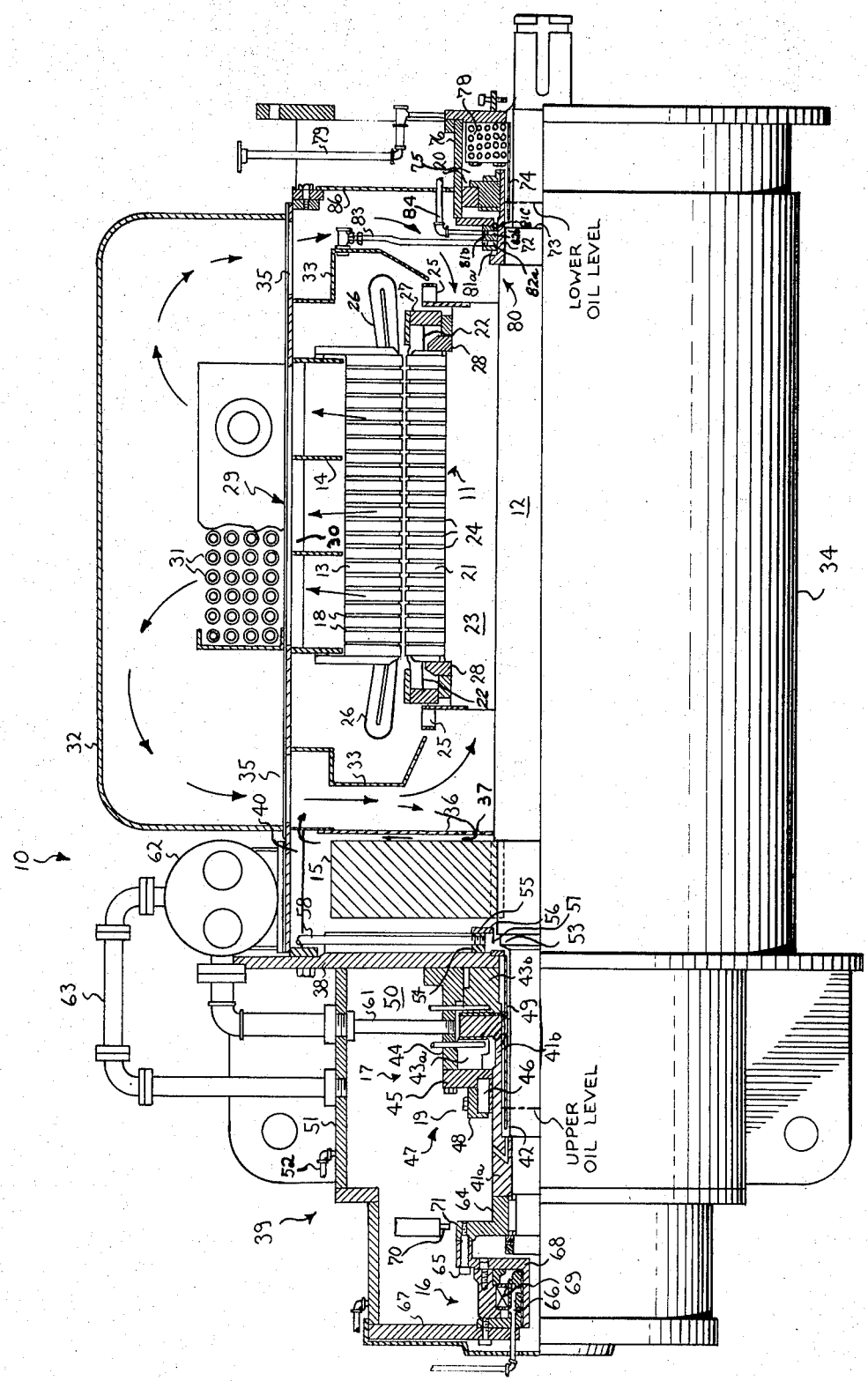

VERTICAL INDUCTION MOTOR

This invention relates to dynamoelectric machines and in particular, to vertical induction motors particularly adapted for driving a pump circulating coolant through a nuclear reactor.

In the design of nuclear power plants, it is necessary to pump a liquid coolant, typically water, through the nuclear reactor to absorb the heat generated by nuclear fission. Because failure to remove this heat can have catastrophic results, it is desirable to assure continued circulation of water through the reactor for a limited period upon failure of the electrical supply to the motor driving the pump. This normally is accomplished by designing a pre-determined quantity of inertia into the hydraulic drive system, e.g., by utilizing either a flywheel on the pump motor or a high inertia rotating power supply such as a motor-generator set to energize the pump motor. In those circulating systems wherein the coolant is pumped by a plurality of pumps to a common manifold before entering the reactor, it also is desirable to include an anti-reverse device within the pump motor to inhibit back flow of water upon shutdown of any pump within the common hydraulic circuit and to prevent any such back flow from causing reverse motor rotation.

Among the pump motor designs heretofore employed to circulate water through nuclear reactors have been vertical induction motors having a single flywheel situated between the rotor and the drive end of the motor. In such motors, however, the rotor cannot be removed from the stator for servicing without removing either the flywheel or the stator itself. Pump motors also have utilized flywheels situated at the opposite drive end of the motor with an anti-reverse device disposed in a circumferentially overlying attitude relative to the flywheel. However, relatively large diameter anti-reverse devices are required to encompass the flywheel and mechanical failure of the anti-reverse device could damage the flywheel making repair of the motor costly.

Other pump motor designs also have included the utilization of two flywheels situated on opposite ends of the rotor with an anti-reverse device mounted at the extreme opposite drive end of the motor shaft. Multiple flywheels located at substantial spans along a single shaft, however, can twist the shaft at the natural frequency of the flywheels tending to shear the motor shaft. Moreover, the double flywheels typically are mounted on spider arms extending from the motor shaft to permit circulation of air through the rotor and mechanical mounting of the large mass flywheel upon the shaft is difficult.

It is therefore an object of this invention to provide a novel vertical pump motor.

It is also an object of this invention to provide a vertical pump motor having a single flywheel easily mounted upon the motor shaft.

It is a further object of this invention to provide a vertical pump motor wherein the rotor is cooled without utilization of either an apertured flywheel or a flywheel spaced apart from the shaft.

These and other objects of this invention generally are achieved by a vertical induction motor having an elongated shaft rotatably mounted between guide bearings disposed along the axial length of the shaft. A double acting thrust bearing and a unitary flywheel are mounted upon the shaft between the guide bearings and an anti-reverse device is fixedly secured to the extreme opposite drive end of the motor. Partition means also are provided in the motor to separate the flywheel from the rotor and coolant is circulated through the rotor in a first radial direction across the face of the partition proximate the rotor. Means are also provided within the partition means for diverting a portion of the coolant through the partition means to flow in a radially opposite direction across the face of the partition remote from the rotor.

Although the invention is described with particularity in the appended claims, a more complete understanding of the invention may be obtained from the following detailed description of a preferred embodiment of the invention taken in conjunction with the accompanying FIGURE illustrating in cross-sectional view the pump motor of this invention.

More specifically, a vertical induction motor 10 in accordance with this invention generally comprises a rotor 11 circumferentially mounted upon shaft 12 for rotation within the cylindrical cavity formed by stator 13, a unitary flywheel 15 for imparting the desired inertia to the motor and an anti-reverse device 16 for preventing reverse rotation of the motor. A double acting thrust bearing 17 situated between the flywheel and the anti-reverse device serves to limit motion of the shaft in an axial direction while guide bearings 19 and 20 permit rotary motion of the shaft while restraining the shaft in a radial direction.

Rotor 11 is a conventional squirrel cage rotor configuration and is characterized by a magnetic yoke 21 formed of a plurality of annular punched laminations mounted in registration to permit axial passage of rotor bars 22 through slots (not shown) punched along the periphery of the laminations. The rotor laminations are mounted upon spider arms 23 extending radially outward from shaft 12 to provide axial flow channels for passage of a flowing coolant, e.g., air, through the rotor interior. At a span of approximately every 2 inches, spacer blocks (not shown) are situated between magnetic laminations to form radial ducts 24 for radial flow of air through the rotor. In typical fashion, fans 25 are secured to shaft 12 at opposite ends of the rotor for circulation of air across the adjacent end turns of stator windings 26 and the protruding ends of rotor bars 22 are electrically interconnected by short circuiting rings 27 attached to the conductor bars. To restrain axial movement of the rotor laminations and to retain the rotor laminations in a compact stack upon the rotor shaft, annular retaining rings 28, suitably of steel, are fixedly secured to the rotor at opposite ends of the stacked laminations.

Stator 13 is similarly composed of a plurality of segmented annular magnetic laminations stacked with spacer blocks between groups of laminations to provide radial air ducts 18 in registration with radial ducts 24 of rotor 11. The stator laminations are supported in a frame 29 having axially extending partitions 30 arcuately separated by transverse sections 14 to permit air flowing through the radial passages in the rotor and stator to pass between cooling coils 31 mounted on the radially exterior face of the frame. An air cooling housing 32 then serves to contain the air circulating through the system and the cooled air is diverted back to the rotor interior through openings 35 to provide substantially closed ventilation of the motor. Although the cooling coils are illustrated as being situated atop only along a portion, approximately 20 percent of the stator periphery with the remainder of stator housing 34 being closed, the cooling coils could extend completely around the periphery of the stator, if desired. Sheet metal air deflectors 33 secured to frame 29 extends radially inwardly over the end turns of stator winding 26 to shield the end turns from air pumped through the motor (along the path illustrated by the arrows) by the centrifugal action of the rotor.

Flywheel 15 is an annular ring secured upon shaft 12 typically by shrinking the flywheel upon the shaft and may be of the type described in co-pending U.S. application Ser. No. 67,181 entitled "Failsafe Rotary Machine" filed Aug. 24, 1970 in the name of Kurt G. Seeliger and assigned to the assignee of the present invention. Desirably the flywheel has dual smooth planar faces to reduce frictional losses during high speed rotation of the flywheel and the flywheel is separated from the rotor by an annular plate 36 extending across the interior of the motor. A plurality of apertures 37 are provided within plate 36 at a radially inward location to permit a portion of the air flowing through the rotor to be diverted into the flywheel cavity wherein the centrifugal force exerted by the flywheel upon the air causes the air to be thrown radially outward for return to the main air flow stream in the rotor through axial duct 40. A flat plate 38 is fixedly secured to the motor housing above the flywheel to separate the motor interior from bearing housing 39.

Double acting thrust bearing 17 is situated within bearing housing 39 and generally comprises an annular thrust collar 41 having an upper portion 41a shrunk upon shaft 12 to form an interference fit while the lower portion 41b of the thrust collar is separated from the shaft to provide an annular, axially extending passage 42 therebetween. The lower portion of the thrust collar in conventional fashion protrudes radially outward into rotational engagement with the upper and lower stationary portions 43a and 43b, respectively, of the thrust bearing. The stationary portions of the thrust bearing are retained radially by an upper bearing support 44 while axial movement of the stationary portions of the thrust bearing is restrained by plate 38 and annular ring 45 fixedly secured to the upper surface of bearing support 44. Annular ring 45 also serves in conjunction with composite annular L-shaped piece 48 as an alignment ring for segments 46 forming the upper guide bearing 47 restraining radial movement of the shaft.

A sleeve 49 is circumferentially disposed between the shaft and annular thrust collar 41 to form the interior sidewall for oil reservoir 50 in association with annular housing 51 forming the exterior sidewall of the reservoir. Sleeve 49 extends to an elevation above the height of the required oil level to retain oil for lubrication of the bearing.

To prevent a pressure imbalance causing leakage of oil from reservoir 50 into the rotor, vents 52 are positioned within the sidewall of housing 51 thereby equalizing the pressure within the thrust bearing housing with the pressure of the underlying rotor housing. Should some oil make its way over the protruding edge of the sleeve during normal motor operation, however, the oil will travel downwardly within the annular passage formed between the sleeve and the shaft to shoulder 53 whereupon the rotary motion of the shaft tends to throw the oil against sidewall 54 disposed in a circumferential attitude about shoulder 53. The oil then drips from the sidewall and is retained within a centrifugal seal 55 characterized by an annular base 56 and an upwardly protruding edge 57 until gravitationally discharged through vent pipe 58 to the exterior of the motor housing.

Continuous circulation of oil is accomplished by means of piping 61 communicating the interior of upper bearing support 44 with oil cooler 62. The oil then is returned from the oil cooler to reservoir 50 by means of conduit 63. Because the centrifugal force exerted upon the oil by the thrust bearing at a normal operating speed of approximately 1,200 rpms is quite substantial, no external pumps are required to circulate the oil through the oil cooler and into the reservoir.

Reverse rotation of the motor shaft is prohibited during shutdown of the motor by anti-reverse device 16 fixedly secured to the motor shaft means of annular coupling 64 mounted upon the shaft and bolts 65 threadedly engaged within threaded apertures in the coupling flange. Anti-reverse device 16 generally is of conventional design and consists of an annular stationary section 66 secured to upper end plate 67 in a substantially intermediate location relative to the U-shaped rotating section 68 of the anti-reverse device. The plurality of sprags 69 are pivotally engaged along the interior of rotating section 68 and are tilted from a radial direction in a common fashion to permit rotation of rotating section 68 in a chosen direction while reverse rotation of the section is inhibited by frictional engagement of the sprags by the stationary section shifting the sprags to a more radial disposition thereby locking the rotary and stationary section of the anti-reverse device. Because sprags 69 are situated on the rotary portion of the anti-reverse device, the sprags are centrifugally tilted back during desired motor operation to reduce frictional wear of the sprags relative to the anti-reverse devices having sprags mounted on the stationary portion of the device. Desirably, the outer flange of coupling 64 has radially extending apertures 71 equally spaced about the periphery of the coupling flange to permit speed detection by means of an electromagnetic counter 70 activated by each change in electromagnetic flux path produced by the introduction of a radial aperture into the magnetic sensing region of the counter.

Radial support of the rotor shaft at the drive end of the motor is provided by lower guide bearing 20 circumferentially disposed about the lower exterior of collar 72. The upper interior portion of the collar is shrunk upon shaft 12 above shoulder 73 along the shaft to fixedly secure the collar to the shaft while providing an annular region 74 between the shaft and the lower portion of the collar. The lower guide bearing is submerged within an oil reservoir 75 formed between outer housing 76 of the bearing and annular sleeve 74 extending concentrically upward between the shaft and the guide bearing. A cooling coil 78 communicated to a source of liquid refrigerant through piping 79 serves to inhibit heating of the oil within the lower guide bearing to an excessive temperature.

An annular seal 80 is disposed immediately above the lower guide bearing housing in a circumferential attitude relative to guide bearing collar 72 to inhibit leakage of oil into the rotor interior. The seal generally comprises three annular sections 81a, 81b and 81c disposed at an attitude to provide dual annular passages 82a and 82b between the sections. Air from the motor interior is communicated to upper annular section 82a through conduit 83 to provide a positive pressure within the seal while lower annular section 82b is exhausted through conduit 84 to the atmosphere. Desirably conduit 83 is metered relative to the increased air pressure produced within the stator end turn cavities by fans 25 to provide a slightly positive pressure within the upper annular cavity to inhibit oil flow across section 81b.

During operation of the motor in accordance with this invention, the rotary motion of rotor 11 impels air within the rotor housing in a radial direction to pass through the aligned air ducts within the stator and the motor frame to be cooled by liquid refrigerant flowing within cooling coil 31. The cooled air then is diverted in axially opposite directions to pass into opposite ends of the rotor through openings 35 and the air passage formed between sheet metal air deflectors 33 and the juxtaposed plates, i.e., plates 36 and 86, extending across the cross-section of the motor. The portion of the air stream flowing adjacent plate 36 also passes through apertures 37 and is impelled radially outward by the rotary motion of the flywheel to axial passages 40 within the frame of the rotor to return to the main air stream. Because the main air stream is shielded from the flywheel, there is minimum interference between air flowing on either side of the plate 36 and optimum cooling of the motor is effected.

What I claim as new and desire to secure by Letters Patent of the United States is:

1. In a dynamoelectric machine, the combination comprising an elongated shaft, dual guide bearings circumferentially disposed about said shaft at axially spaced locations to permit rotation of said shaft therein, a rotor and a double acting thrust bearing mounted upon said shaft between said guide bearings, a unitary flywheel fixedly secured to said shaft between said rotor and said double acting thrust bearing to supplement the inertia of said rotor, an anti-reverse device fixedly secured to said shaft at an axial location adjacent the end of said double acting thrust bearing remote from said flywheel, partition means separating said flywheel from said rotor, means for circulating coolant through said rotor to pass said coolant in said first radial direction across the face of said partition means proximate said rotor, first means within said partition means for diverting a portion of said coolant through said partition means to pass across the face of said partition means proximate said flywheel in a direction radially opposite the direction of coolant flow across the face of the partition means proximate said rotor and second means within said partition means for returning said diverted coolant to the circulating coolant passing across the face of the partition means proximate the rotor, said second means being disposed within said partition means at a radially removed location relative to said first means.

2. A dynamoelectric machine according to claim 1 further including a reservoir of liquid lubricant covering the bearing faces of said thrust bearing, a sleeve concentrically mounted between said shaft and said thrust bearing, said sleeve extending to an elevation above the height of said lubricant reservoir and means disposed between said double acting thrust bearing and said flywheel for removing lubricant entering the region between said sleeve and said shaft.

3. A dynamoelectric machine according to claim 2 wherein said lubricant removal means includes a shoulder extending radially from said shaft at an axial location between said flywheel and said reservoir and an annular seal circumferentially disposed about said shaft below said shoulder, said seal having an annular lip protruding upwardly towards said shoulder along the face of said seal proximate said shaft.

4. A vertical induction motor comprising an elongated shaft, guide bearings circumferentially mounted about opposite ends of said shaft, a double acting thrust bearing and a rotor axially mounted upon said shaft between said guide bearings, a flywheel mounted upon said shaft between said rotor and said thrust bearings, first partition means disposed intermediate said flywheel and said thrust bearings, coupling means fixedly secured to said shaft at the extreme opposite drive end of said shaft, an anti-reverse device affixed to said coupling means, a housing enclosing said thrust bearing, a sleeve concentrically mounted between said shaft and said thrust bearing, a reservoir of liquid lubricant disposed between said housing and said sleeve, said lubricant reservoir extending to an elevation covering both the bearing surfaces of said thrust bearing and said adjacent guide bearing, means situated upon said shaft between said flywheel and said reservoir for removing lubricant entering the region between said sleeve and said shaft, means for circulating coolant through said rotor, second partition means disposed between said flywheel and said rotor for substantially restricting contact between said coolant and said flywheel and means for diverting a portion of said coolant circulating through said rotor through said second partition means to pass said coolant across the face of the flywheel proximate said rotor in a radially outward direction.

5. A vertical induction motor according to claim 4 further including cooling means disposed outside said lubricant reservoir, means for transmitting frictionally heated lubricant from said thrust bearing to said cooling means, means for returning lubricant from said cooling means to said reservoir, a second housing enclosing the guide bearing disposed proximate the drive end of said motor, second lubricant reservoir within said second housing extending to an elevation above said guide bearing and cooling coil means within said second lubricant reservoir for removing heat from said lubricant.

6. A vertical induction motor according to claim 4 further including means for circulating said coolant through said rotor in a first radial direction across said second partition face proximate said rotor and means within said second partition for diverting a portion of said coolant through said partition to flow in a radially opposite direction across the face of said partition remote from said rotor.

* * * * *